United States Patent [19]
Lawrence

[11] 4,120,527
[45] Oct. 17, 1978

[54] CAB DESIGN

[75] Inventor: Dean M. Lawrence, Aurora, Ill.

[73] Assignee: Caterpillar Tractor Co., Peoria, Ill.

[21] Appl. No.: 787,811

[22] Filed: Apr. 15, 1977

[51] Int. Cl.² .............................................. B62D 33/06
[52] U.S. Cl. .................................... 296/28 C; 98/2.11
[58] Field of Search ...................... 296/15, 28 R, 28 C, 296/28 G, 24 R; 98/2, 2.05, 2.08, 2.11; 237/12.3 A, 12.3 B, 12.3 C, 28

[56] References Cited

U.S. PATENT DOCUMENTS

| | | | |
|---|---|---|---|
| 2,185,855 | 1/1940 | Kysor | 98/2.05 |
| 3,632,754 | 1/1972 | Woodrich | 98/2.05 X |
| 3,868,896 | 3/1975 | Doll et al. | 98/2.11 |
| 4,006,931 | 2/1977 | Groves | 98/2.11 |

*Primary Examiner*—Joseph F. Peters, Jr.
*Assistant Examiner*—Gene A. Church
*Attorney, Agent, or Firm*—Wegner, Stellman, McCord, Wiles & Wood

[57] ABSTRACT

A vehicle cab structure design providing air circulation through the cab compartment wherein the rear wall of the cab structure forms air flow passage defining a portion of the air flow circulation path. Suitable apparatus for controlling the temperature of the circulated air may be provided. The circulation may be effected by a suitable air moving device, such as a fan, which may be associated with the temperature controlling apparatus. In the illustrated embodiment, a forced air fan is utilized for effecting the desired circulation of the cab air. A fresh air inlet may be provided for introducing a preselected amount of fresh air into the circulating air. A filter may be provided for filtering the circulated air. The filter may be arranged to filter the incoming fresh air also. The filter may be arranged horizontally to permit self-cleaning with the debris therefrom being collected on a subjacent duct wall. The rear wall structure may form a structural support portion of the cab suitable to support the top wall of the cab.

15 Claims, 4 Drawing Figures

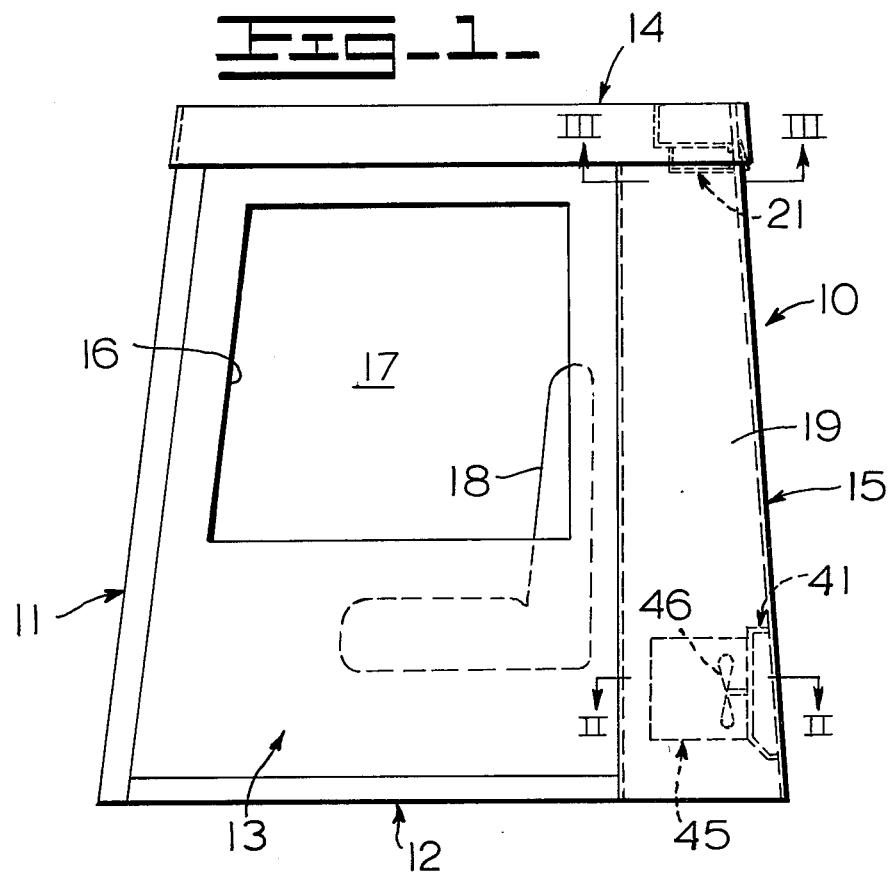
Fig-1-
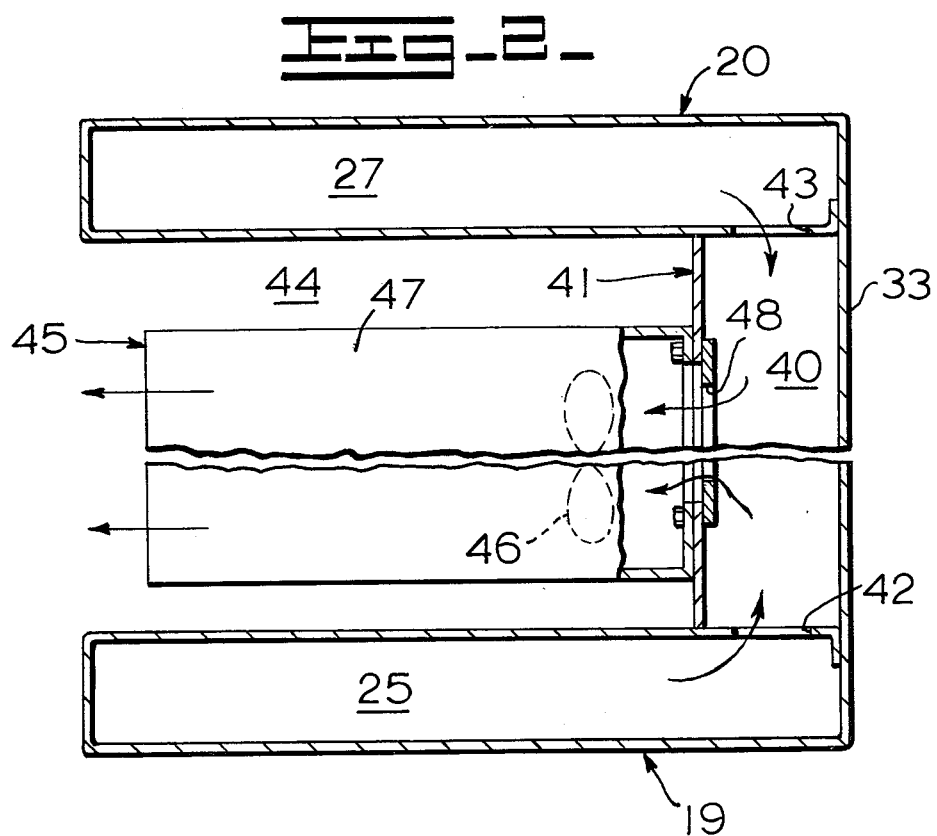
Fig-2-

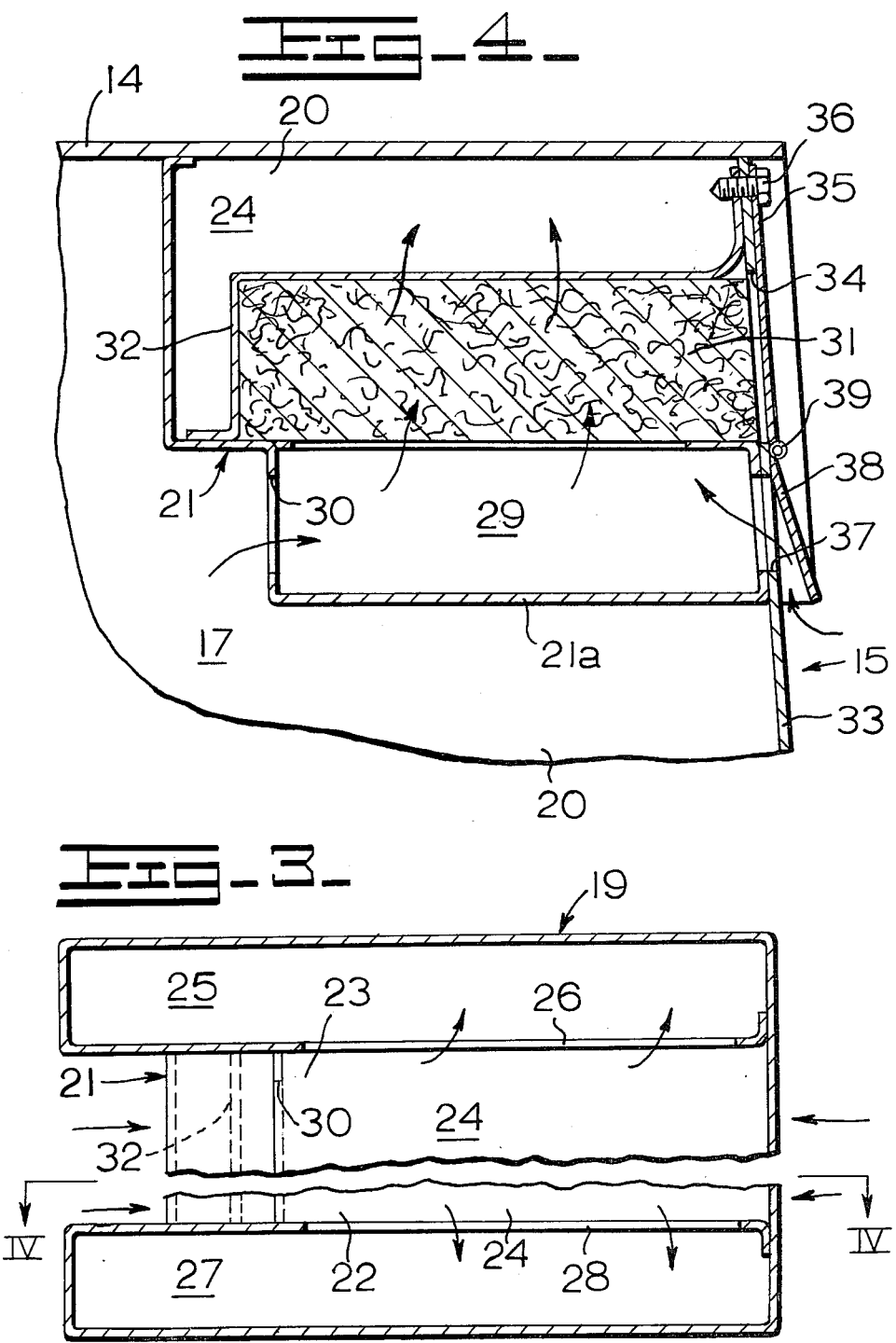

CAB DESIGN

BACKGROUND OF THE INVENTION

1. Field of the Invention

This invention relates to vehicles and in particular to vehicle cab structures.

2. Description of the Prior Art

In one conventional form of vehicle cab structure, wall means are provided for defining an operator's compartment wherein the operator may be seated on a suitable seat accessible to the operating controls of the vehicle. The cab may be provided with windows permitting the compartment to be effectively closed as during inclement weather. The cab may further be provided with a door providing access to the operator's compartment which similarly may be retained in a closed position during operation of the vehicle.

In operating the vehicle at relatively low temperatures, it is desirable to provide some means for heating the compartment.

SUMMARY OF THE INVENTION

The present invention comprehends an improved vehicle cab structure providing controlled circulation of air through the operator compartment in a novel and simple manner.

More specifically, the inveintion comprehends the provision of such a vehicle cab structure wherein a portion of the wall means defines air flow passages comprising a portion of the circulating air flow path.

In the illustrated embodiment, the wall means comprises the rear wall structure of the cab and more specifically, is defined by a pair of upright hollow corner portions, an upper horizontal wall portion, and a lower horizontal wall portion.

Means are provided for conducting air from the compartment into the upper horizontal wall portion, downwardly through the upright corner portions, and through the lower horizontal wall portion back into the compartment.

Air filter means may be provided in the wall means, and in the illustrated embodiment, comprises a filter provided in the upper horizontal wall portion.

Fresh air inlet means may be provided for introducing a quantity of fresh air into the circulated air.

In the illustrated embodiment, the fresh air inlet means is arranged to direct the fresh air through the filter means for subsequent circulation with the cirulating air back to the compartment.

The rear wall structure may be provided with a movable closure permitting facilitated access to the filter for servicing thereof when desired.

In the illustrated embodiment, the air circulation is effected by a fan associated with the lower horizontal wall means, and more specifically, a fan associated with a heater carried by the lower horizontal wall means through which the circulated air is passed prior to the return to the operator compartment. The heater may comprise an air conditioner which may be alternatively utilized as an air cooling means, when desired.

The rear wall structure may comprise a generally U-shaped structure in horizontal section at the upper and lower horizontal wall portions thereof. The rear wall structure may comprise supporting means for the top wall of the cab.

The vehicle cab structure of the present invention is extremely simple and economical of construction while yet providing the highly improved features discussed above.

BRIEF DESCRIPTION OF THE DRAWING

Other features and advantages of the invention will be apparent from the following description taken in connection with the accompanying drawing wherein:

FIG. 1 is a side elevation of a vehicle cab structure embodying the invention;

FIG. 2 is an enlarged horizontal section thereof taken substantially along the line II—II of FIG. 1;

FIG. 3 is an enlarged fragmentary horizontal section thereof taken substantially along the line III—III of FIG. 1; and FIG. 4 is a vertical section thereof taken substantially along the line IV—IV of FIG. 3.

DESCRIPTION OF THE PREFERRED EMBODIMENT

In the exemplary embodiment of the invention as disclosed in the drawing, a vehicle cab structure generally designated 10 is shown to comprise a cab structure suitable for use as the cab of an earthmoving vehicle or tractor. The cab structure may include a front wall 11, opposite sidewalls, including a left sidewall 12 having a selectively openable door 13, a top wall 14, and a rear wall 15. The front, side, and rear walls may be provided with suitable windows, such as window 16 in door 13 permitting an operator within the compartment 17 of the cab and seated on a suitable seat 18 therein, to operate the vehicle from within the closed cab.

The present invention is concerned with the problem of providing a circulation of air through the operator's compartment 17 of the closed cab. More specifically, the present invention comprehends the provision of a novel arrangement of rear wall 15 whereby the rear wall synergistically defines the rear wall means of the cab, means for supporting the rear of the top wall 14, and means for providing circulation of the cab compartment air. More specifically, rear wall means 15 includes a pair of hollow uprights 19 and 20, defining the upright left and right rear corners of the cab structure 10, an upper hollow horizontal wall 21 having a left end 22 connected to left upright 19 and a right end 23 connected to right upright 20. An upper interior space 24 of the upper wall is in communication at the left end 22 of the upper wall with the interior space 25 of the hollow upright 19 through an opening 26 therebetween, and the upper space 24 is in air flow communication with the interior 27 of the right upright 20 by means of an opening 28 providing communication between the righthand end 23 of the wall 21 and upright space 27.

As shown in FIG. 4, the upper wall further defines a lower space 29 which is in communication with the compartment 17 through an opening 30. A suitable air filter generally designated 31 is removably installed in a housing 32 mounted within the upper hollow wall 21 intermediate the upper space 24 and lower space 29. A rear panel 33 defining the rear wall portion of the uprights 19 and 20, as shown in FIG. 2, extends fully between the uprights to form the outer wall panel of the cab rear wall 15. As shown in FIG. 4, the upper end of the rear wall panel 33 defines an opening 34 which is selectively closed by a closure 35 as by means of suitable screws 36 to provide selective access to the filter 31 through the opening 34 as for removal and replacement of the filter as in servicing the air circulating means.

As shown in FIG. 4, the upper wall 21 defines a lower horizontal portion 21a spaced below the horizontally extending filter 31. Thus, the filter is self-cleaning with the debris from the filter tending to collect on the subjacent wall portion 21a for facilitated removal.

Rear wall panel 33 further defines a second opening 37 subjacent opening 34 and provided with an overhanging deflector 38 for conducting outside fresh air into the lower wall space 29 for flow with the air from compartment 17 upwardly through filter 31, and outwardly through upper space 24 and openings 26 and 28 into the upper ends of the upright spaces 25 and 27. As illustrated in FIG. 4, the threaded securing means 36 may further secure the housing 32 within the wall 21. As further shown, the closure 35 may be movably carried on the wall panel 33 by a suitable hinge 39.

The circulated air may now pass downwardly through the spaces 25 and 27 of the left and right uprights, respectively, and into the interior space 40 of a lower hollow horizontal wall means 41 through suitable openings 42 and 43 in the lower end of uprights 19 and 20, respectively, as shown in FIG. 2. As shown, the lower horizontal wall 41 extends fully between the uprights 19 and 20 and is defined in part by a lower portion of the rear wall panel 33.

As further shown in FIG. 2, the fore-and-aft horizontal width of lower wall means 41 is substantially less than the fore-and-aft dimension of the uprights 19 and 20 whereby a forwardly opening recess 44 is defined between the uprights 19 and 20 forwardly of the lower wall 41. In the illustrated embodiment, means for controlling the temperature of the circulated air are provided in space 44, and as shown in FIG. 2, such means may comprise a conventional air conditioner 45. The air conditioner may include a conventional air moving means, such as fan 46, and a conventional heat transfer portion 47 which may be utilized selectively as an air cooling means or an air heating means. Alternatively, the air conditioner 45 may comprise solely an air heating means. Air is circulated to the apparatus 45 from the interior 40 of the lower horizontal wall 41 through an outlet 48.

As will be obvious to those skilled in the art, circulation of the cab air may be effected without affecting the temperature thereof either by utilizing the unit 45 in a "Circulate Only" mode, or by omitting the heat transfer portion 47 whereby only the air moving means 46 is provided.

As shown in FIG. 1, the apparatus 45 may be disposed subjacent the operator's seat 18 so that the circulated air flows below the seat and upwardly through the cab around the operator to the opening 30 in the upper horizontal wall 21.

Window 16 of the cab may be selectively removable so that where ambient conditions permit, the cab may be arranged in an open condition obviating the need for the circulation of air through the rear wall means 15.

Thus, the invention provides an improved simplified and facilitated control of the air within the operator's compartment 17 of a vehicle cab wherein a portion of the structural supporting wall means is utilized synergistically as duct means in an air circulation system. The hollow uprights, as seen in FIG. 2, effectively define tubular structural elements of high strength while being formed of relatively thin sheet material. The horizontal upper and lower walls effectively tie the uprights together at their upper and lower ends so as to define a reinforced rigid rear wall structure while yet the horizontal walls may also be formed of relatively thin sheet material. Further, as discussed above, the rear panel of the rear wall means may be utilized as a rear portion of the horizontal walls as well as the rear portion of the uprights, thereby further facilitating construction and minimizing cost of the rear wall structure. Thus, the present invention eliminates the need for extensive ducting means in the cab structure by utilizing portions of the walls and upright supports themselves as the duct defining means.

By means of the air temperature controlling apparatus 45, improved comfort and well being of the operator is provided further providing improved efficiency in the use of the vehicle.

The foregoing disclosure of specific embodiments is illustrative of the broad inventive concepts comprehended by the invention.

The embodiments of the invention in which an exclusive property of privilege is claimed are defined as follows:

1. In a vehicle cab structure defining an operator compartment, an improved air circulating means comprising:
    a pair of parallel, spaced hollow uprights defining upright rear corners of the cab structure;
    an upper hollow horizontal wall having air flow communication at its opposite ends with an upper portion of said hollow uprights;
    a lower hollow horizontal wall having air flow communication at its opposite ends with a lower portion of said hollow uprights;
    first passage means carried by said upper wall for providing air flow communication between said compartment and said hollow upper wall;
    second passage means carried by said lower wall for providing air flow communication between said compartment and said hollow lower wall; and
    air flow means for causing air to be circulated in a flow path through said horizontal hollow walls, upright cab structure corners, and compartment.

2. The vehicle cab structure of claim 1 wherein means for altering the temperature of the circulated air is provided in said flow path.

3. The vehicle cab structure of claim 1 wherein means for heating the circulated air is provided in said flow path.

4. The vehicle cab structure of claim 1 wherein a forced air heater for concurrently heating and forcing circulation of the compartment air is provided in said flow path.

5. The vehicle cab structure of claim 1 wherein means are provided in at least one of said horizontal walls for introducing a preselected amount of outside air into the circulated air flow in said flow path.

6. The vehicle cab structure of claim 1 wherein means are provided for filtering the circulated air in said flow path.

7. The vehicle cab structure of claim 1 wherein means are provided in said upper wall for filtering the circulated air.

8. The vehicle cab structure of claim 1 wherein said air flow means comprises means at said lower wall.

9. The vehicle cab structure of claim 1 wherein means are provided in at least one of said horizontal walls for introducing a preselected amount of outside air into the circulated air flow in said flow path and filter means are provided for filtering said outside air being so introduced.

10. The vehicle cab structure of claim 1 wherein means are provided in at least one of said horizontal walls for introducing a preselected amount of outside air into the circulated air flow in said flow path and filter means are provided for concurrently filtering said outside air being so introduced and the air being circulated through said compartment and rear wall means.

11. In a vehicle cab structure defining an operator compartment, an improved air circulating means comprising:
   a pair of parallel, spaced hollow uprights defining upright rear corners of the cab structure;
   an upper hollow horizontal wall having air flow communication at its opposite ends with an upper portion of said hollow uprights;
   a lower hollow horizontal wall having air flow communication at its opposite ends with a lower portion of said hollow uprights;
   inlet means in said upper wall for providing air flow from said compartment into said hollow upper wall;
   outlet means in said lower wall for providing air flow from said hollow lower wall into a lower portion of said compartment; and
   air flow means for causing air to be circulated in a flow path through said inlet means from an upper portion of said compartment downwardly through said rear wall means, outwardly through said outlet means and into the lower portion of said compartment.

12. The vehicle cab structure of claim 11 wherein an air filter is provided in said upper hollow wall for filtering the air flowed from said compartment through said inlet means.

13. The vehicle cab structure of claim 11 wherein a heater is mounted on said lower horizontal wall for heating air flowing from said lower wall to said compartment.

14. The vehicle cab structure of claim 11 wherein means are provided defining a fresh air inlet to said upper hollow wall from outwardly of said cab and an air filter is provided in said upper hollow wall for filtering the air flowed from said compartment through said inlet means and from said fresh air inlet.

15. The vehicle cab structure of claim 11 wherein an air filter is provided in said upper hollow wall for filtering the air flowed from said compartment through said inlet means, said upper wall further defining a movable closure member for providing selective access to said filter as for servicing and replacement thereof.

* * * * *